Feb. 23, 1960 C. W. KRAVITCH 2,925,682
OUTRIGGER CLIP
Filed Sept. 5, 1958
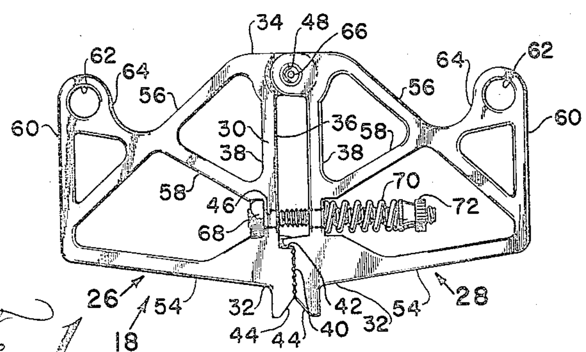
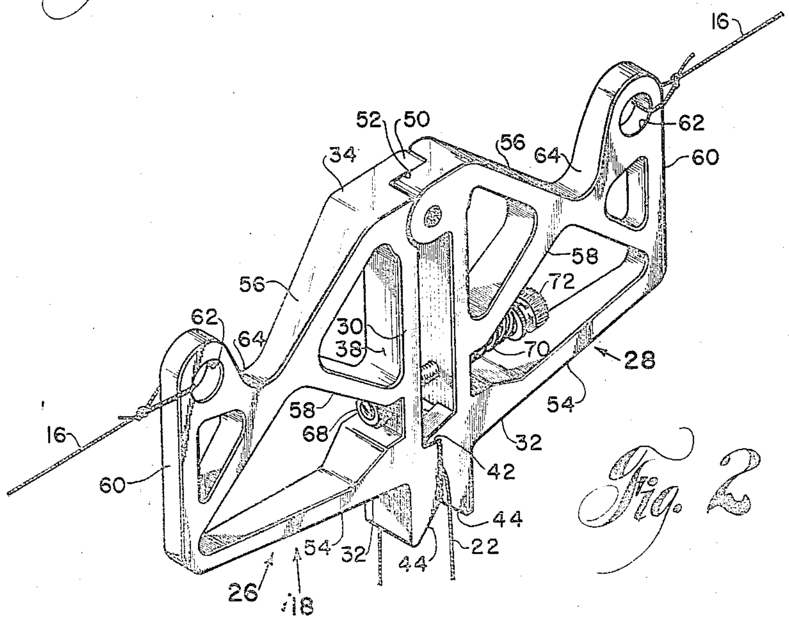
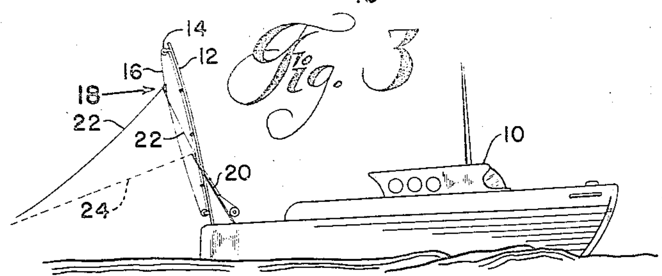
INVENTOR.
Charles W. Kravitch
BY
Stanley J Prisch
his Attorney 2,925,682

OUTRIGGER CLIP

Charles W. Kravitch, Canonsburg, Pa.

Application September 5, 1958, Serial No. 759,223

4 Claims. (Cl. 43—43.1)

This invention relates to an outrigger clip and more particularly to an outrigger clip for holding a fishing line in an elevated position while trolling.

In deep sea fishing it is common practice to hold the fishing line in an elevated position relative to the boat while trolling. The fishing line is usually held in the elevated position by an outrigger arrangement extending upwardly from the rear of the boat. A pulley is secured to the upper portion of the outrigger and an endless loop of line is positioned around the pulley. Secured to the endless loop is a clip to which a portion of the fishing line is frictionally attached. The clip is then raised to an elevated position and the end of the fishing line with the bait secured thereto is trolled behind the boat.

The clip arrangement is adapted to provide slack in the fishing line when the bait is struck by a bill fish while the boat is moving. The clip also functions to provide a readily visual signal to the fisherman that a fish has struck the bait. When the fish strikes the bait the portion of the line frictionally held by the clip is disengaged therefrom and the fisherman is left to his skills to land the fish.

There are several undesirable features of the known outrigger clips that cause concern to the fisherman. Firstly, in heavy seas the fishing line is alternately taut and then slack adjacent the clip because of the swells. During the slack period the line occasionally loops about or becomes entangled in the clip so that it does not disengage when the fish strikes the bait. This usually results in the fish getting away. Secondly, several factors contribute to the amount of pull exerted on the fishing line frictionally engaged in the clip. Among these factors there is boat speed during trolling, depth of the bait and the roughness of the sea. If the clip is constructed to have slight frictional engagement with the fishing line, a slight pull on the fishing line will disengage it from the clip. A clip of this construction is unfit in heavy seas where the pull on the line is variable and at times exceeds the frictional engagement of the line to the clip. Conversely, where the frictional engagement is large, the same results occur as if the line had looped or become entangled in the clip. Thirdly, the means for attaching the outrigger clip to the endless loop is unreliable during heavy seas. As the moving boat pitches due to the heavy seas, the endless loop exerts a pulling force on the outrigger clip. On certain outrigger clips this pulling force automatically disengages the fishing line from the line gripping portion and provides a false signal for the fisherman.

With my improved outrigger clip these undesirable features have been eliminated. My clip is so constructed that it is extremely difficult for the fishing line to become entangled with it. I provide tapered rib portions adjacent the serrated line gripping portions that prevent the fishing line from becoming entangled with the clip.

There is also provided in my improved outrigger clip a means to vary the frictional engagement between the serrated line gripping portions and the fishing line so that compensation may be made for the heretofore described variables.

In my improved outrigger clip the line securing means is arranged laterally and on opposite sides of the pivot connection so that varying pull on the endless loop does not disengage the fishing line from the line gripping portions.

In addition to eliminating the above undesirable features, my clip is of simple and inexpensive construction in that there is employed two symmetrical jaw members that can be fabricated of synthetic material or corrosive resistant metal. Since the jaw members are symmetrical, only a single die or forming member is required.

Accordingly, the principal object of this invention is to provide an outrigger clip that does not become entangled with the fishing line.

Another object of my invention is to provide an outrigger clip having an improved means to vary the frictional engagement between the serrated line gripping portions and the fishing line.

Another object of my invention is to provide an improved outrigger clip having two symmetrical jaw members that result in a simple and inexpensive device having a minimum number of parts.

These and other objects and advantages of the invention will, however, hereinafter more fully appear.

The invention will be described with reference to the accompanying drawings in which:

Figure 1 is a top plan view of my outrigger clip.

Figure 2 is a perspective view of my outrigger clip.

Figure 3 is a view in elevation of a boat with my fishing clip operatively attached thereto.

Referring to the drawings and particularly to Figure 3 there is illustrated a fishing boat 10 having a vertical outrigger member 12 extending upwardly from its stern. Secured to the upper portion of the outrigger 12 is a pulley member 14 through which an endless loop of line 16 is threaded. Secured to the endless loop 16 is my outrigger clip generally designated by the numeral 18. A fishing pole 20 is positioned in the boat 10 and has a portion of the fishing line 22 frictionally engaged by the outrigger clip 18 adjacent the pulley 14. The end portion of the fishing line 22 extends rearwardly of the boat 10 and has both a hook and bait secured thereto. The end of the fishing line 22 extends into the water and is trolled behind the fishing boat 10. The dotted line 24 indicates the fishing line 22 after it has become disengaged from the outrigger clip 18 due to a fish striking the bait secured thereto.

Now referring in detail to my outrigger clip 18 as illustrated in Figures 1 and 2, there is shown a pair of jaw members generally designated by the numerals 26 and 28. The jaw members 26 and 28 are symmetrical in construction, that is, both jaw members 26 and 28 are of identical construction and may be fabricated in the same die or forming mechanism. One jaw member, i.e. jaw member 26, will be described in detail and similar numerals indicate similar portions of jaw member 28.

The jaw member 26 has a body portion 30 having a front portion 32 and a rear portion 34. The body portion 30 also has an inner side portion 36 and an outer side portion 38. The inner side portion 36 has an inwardly spaced line gripping portion 40 forming a shoulder 42. The line gripping portion 40 has an outwardly diverging portion 44.

The body portion 30 has a horizontal aperture 46 therethrough adjacent the line gripping portion 40 and a vertical aperture 48 (as viewed in top plan, Figure 1) adjacent the rear portion 34. The body portion 30 has a horizontally offset portion 50 which provides an upper shoulder 52.

Extending laterally from the body portion 30 are a plurality of rib members 54, 56 and 58. The rib member 54 is in rearward diverging relation with the body front portion 32 and joins the rib member 56 to form a triangular arrangement with the body portion 30. The rib member 58 reinforces this triangular arrangement. Extending rearwardly from the junction of ribs 54 and 56 is another rib 60 that terminates in a line receiving aperture 62. The line receiving aperture 62 is arranged in substantially lateral alignment with the body portion aperture 48. A reinforcing rib 64 connects the rearwardly extending rib 60 with the rib 56. The jaw members 26 and 28 are positioned with their offset portions 50 abutting each other and their vertical apertures 48 aligned. The horizontal apertures 46 are also in alignment and the rib portions 40 are in abutting relation with each other. A pivot pin 66 extends through the aligned vertical apertures 48 and pivotally secures the jaw members 26 and 28 to each other. A bolt 68 extends through aligned apertures 46 and a coil spring 70 is positioned therearound. A nut 72 is threadedly secured on the bolt 68 and compresses the spring 70 against the body outer side portion 38 to thereby urge the line gripping portions 40 toward each other. It should be noted that by varying the compression of spring 70 the frictional engagement of the line gripping portions 40 to each other may also be varied.

As previously stated and as is evident in Figure 2, the endless loop of line 16 is secured in the apertures 62 of the jaw members 26 and 28. Because of the substantial alignment of line 16 with the pivot pin 66 any tension exerted on line 16 will not materially affect the operation of my outrigger clip 18.

The fishing line 22 is positioned between line gripping portions 40 and is frictionally engaged therebetween by means of the bolt 68, spring 70 and nut 72 which urge the two line gripping portions toward each other. When desired, the compression of spring 70 may be increased to provide for a greater frictional force to be exerted on the fishing line 22 by the line gripping portions 40. Conversely, if it is desired, the compressive force of spring 70 may be released until the desired degree of frictional engagement between the line gripping portions 40 and the fishing line 22 is obtained.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In an outrigger clip the combination comprising a pair of jaw members each having a body portion with a front portion, a rear portion and a side portion, said side portion having a line gripping portion adjacent said front portion, said jaw members each having a line connecting portion adjacent said rear portion, said jaw members each having a rib portion adjacent said front portion and extending laterally from said body portion away from said line gripping portion, said jaw members positioned with said side portions facing each other with said line gripping portions abutting each other and said rib portions extending laterally in opposite directions from said respective body portions, pivot means connecting said jaw members to each other adjacent said rear portion, and adjustable biasing means positioned between said pivot means and said line gripping portions and urging said line gripping portions into abutting relation with each other, said line gripping portions adapted to release a fishing line secured therebetween in response to a predetermined tension on said fishing line, said rib members adapted to prevent tangling of said fishing line about said outrigger clip.

2. In an outrigger clip the combination comprising a pair of symmetrical jaw members, each having a body portion with a front portion, a rear portion, first side portion and second side portion, said first side portion having an inwardly spaced line gripping portion adjacent said front portion, said line gripping portion having an outwardly diverging end portion, said jaw members each having a line connecting portion adjacent said rear portion, said jaw members each having a rib portion adjacent said front portion and extending laterally from said second side portion away from said line gripping portion, said jaw members positioned with said first side portions facing each other with said line gripping portions abutting each other and said rib portions extending laterally in opposite directions from said respective body portions, pivot means connecting said jaw members to each other adjacent said rear portion, and adjustable biasing means positioned between said pivot means and said line gripping portions and urging said line gripping portions into abutting relation with each other, said line gripping portions adapted to release a fishing line secured therebetween in response to a predetermined tension on said fishing line, said rib members adapted to prevent tangling of said fishing line about said outrigger clip.

3. In an outrigger clip the combination comprising a pair of symmetrical jaw members each having a body portion with a front portion, a rear portion, first side portion and second side portion, said first side portion having a fishing line gripping portion adjacent said front portion, said jaw members each having a line connecting portion in spaced lateral relation to said second side portion and adjacent said rear portion, said body portion having a horizontal aperture therethrough adjacent said line gripping portion, said jaw members positioned with said first side portions facing each other and said line gripping portions abutting each other and said horizontal apertures aligned with each other, pivot means connecting said jaw members to each other adjacent said rear portion, said pivot means substantially aligned with said laterally spaced line connection portions, a bolt member having an end portion and extending through said aligned horizontal apertures and abutting one of said second side portions, a nut threadedly secured to said bolt member end portion in spaced relation to said other second side portion, resilient means positioned between said second side portion and said nut biasing said line gripping portions into abutting relation with each other, said nut and resilient means adapted to vary the biasing force on said line gripping portions, said line gripping portions adapted to release a fishing line secured therebetween in response to a predetermined tension on said fishing line.

4. In an outrigger clip the combination comprising a pair of symmetrical jaw members each having a body portion with a front portion, a rear portion, first side portion and second side portion, said first side portion having an inwardly spaced line gripping portion adjacent said front portion, said line gripping portion having an outwardly diverging end portion, said jaw members each having a line connecting portion in spaced lateral relation to said second side portion and adjacent said rear portion, said jaw members each having a rib portion adjacent said front portion and extending laterally from said second side portion away from said line gripping portion, said body portion having a vertical aperture therethrough adjacent said rear portion, said body portion having a horizontal aperture therethrough adjacent said line gripping portion, said jaw members positioned with said first side portions facing each other with said line gripping portions abutting each other and with said vertical and horizontal apertures aligned with each other, a pin member extending through said aligned vertical apertures pivotally connecting said jaw members to each other adjacent said rear portion, a bolt member having an end portion and extending through said aligned horizontal apertures and abutting one of said second side portions, a nut threadedly secured to said bolt member end portion in spaced relation to said other second side portion, resilient means positioned between said second side portion and said nut biasing said line gripping portions into abutting relation with each other, said nut and resilient means adapted to vary the biasing force of said line gripping portions, said line gripping portions adapted to release a fishing line secured therebetween in response to a predetermined tension on said fishing line, said rib members adapted to prevent tangling of said fishing line about said outrigger clip.

References Cited in the file of this patent

UNITED STATES PATENTS

| | | |
|---|---|---|
| 1,423,785 | Wilde | July 25, 1922 |
| 1,800,756 | Sass | Apr. 14, 1931 |
| 2,493,305 | McKinney | Jan. 30, 1950 |
| 2,819,555 | Jackson | Jan. 14, 1958 |